Jan. 27, 1959  J. R. SNYDER ET AL  2,871,109
AUTOCLAVE
Filed May 6, 1955

INVENTORS
John R Snyder
Peter J Hagerty
BY Melvin C Molstad
Ralph Hammar
Attorney

United States Patent Office 2,871,109
Patented Jan. 27, 1959

2,871,109

AUTOCLAVE

John Robert Snyder, Lititz, Peter Frank Hagerty, Drexel Hill, and Melvin C. Molstad, Moylan, Pa., assignors to the Trustees of the University of Pennsylvania, Philadelphia, Pa.

Application May 6, 1955, Serial No. 506,527

3 Claims. (Cl. 23—290)

This invention is intended to improve the performance of closed autoclaves, including high pressure autoclaves, for chemical reactions between gases and liquids, including liquids containing suspended solids, by recycling the gases through the liquid reactants. In a preferred form, a submerged rotating impeller circulates the liquid and pumps gas through a hollow shaft from above the liquid level and disperses the gas and any solids which must be kept in suspension throughout the reacting liquid.

Figure 1:
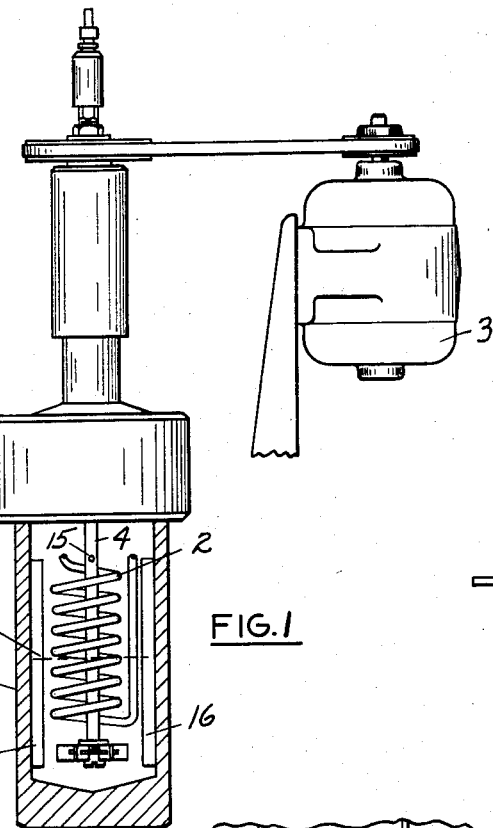
Figure 5:
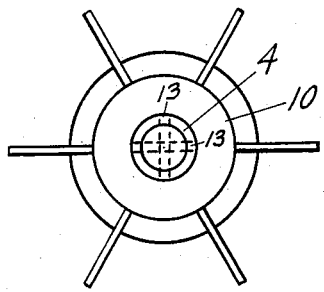
Figure 6:
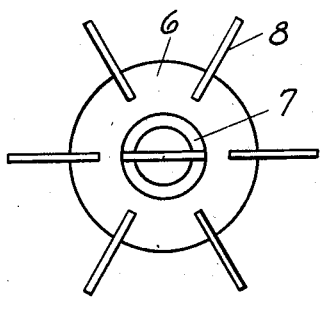
Figure 2:
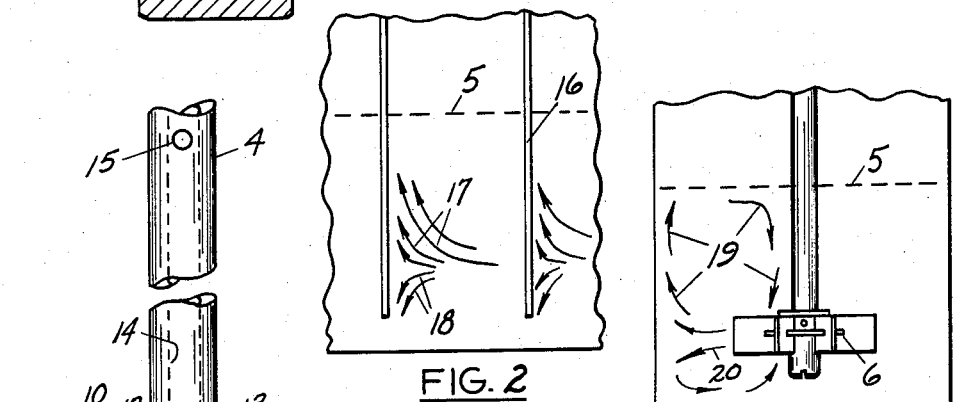
Figure 3:
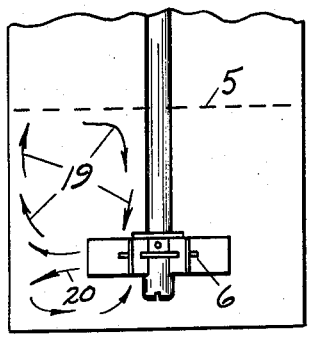
Figure 4:
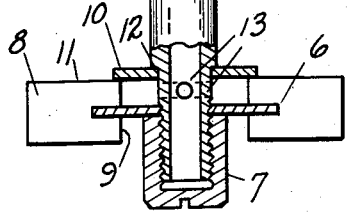

In the drawing, Fig. 1 is a sectional elevation of a high pressure reactor; Fig. 2 is a developed side view showing the gas and liquid circulation as viewed from the outside of the vessel; Fig. 3 is a sectional view showing the gas and liquid circulation between the outside and center of the vessel; Fig. 4 is a sectional side elevation of the gas and liquid dispersing impeller; Fig. 5 is a top view of the impeller and Fig. 6 is a bottom view.

In Fig. 1 of the drawing, which is a diagrammatic representation of an autoclave useful in physical and chemical reactions, the conventional parts will be readily identified, 1 being the vessel, 2 the coil for heating or cooling the reacting substances and 3 the motor for driving the agitator shaft 4. The shaft may extend through the top of the vessel as shown or through the bottom of the vessel. The autoclave is usually filled to a liquid level indicated at 5. The internal pressure within the vessel naturally. depends upon the reaction to be performed and may run up to many thousands of pounds per square inch. The parts so far described are or may be of common construction.

In reactions between gases and liquids, it is advantageous that the liquid be continuously circulated and in addition that the gas together with any solid catalysts be intimately dispersed or mixed in the liquid to develop the maximum interfacial surface between the gas and liquid. This is accomplished by the impeller construction shown in detail in Figs. 4, 5 and 6. As there shown, the rotary agitator shaft 4 has fixed at its lower end a disc-like impeller hub 6 which is held on the lower end of the shaft by a threaded nut 7. Fixed on the hub 6 are a plurality of generally rectangular radial blades 8. The blades project radially outside the diameter of the hub 6 and the upper and lower edges of the blades respectively project above and below the upper and lower surfaces of the hub. The inner ends 9 of the blades terminate radially outward of the agitator shaft 4 but extend radially inward of the disc 10 which engages the upper edges 11 of the blades 8 and which is clamped against the shoulder 12 as the nut 7 is tightened. When the impeller is in place, drilled holes 13 in the shaft 4 are in the space between the disc 12 and the upper side of the hub 6. The agitator shaft has a hollow bore 14 so that gas can flow in through inlet openings 15 in the upper end of the shaft well above the liquid level in the vessel and can flow down through the bore 14 and out through the holes 13 between the disc 12 and the upper side of the hub 6.

As the impeller is rotated by the shaft 4 there are two kinds of circulation set up, a circulation circumferentially around the lower end of the vessel which is to a large extent stopped by vertical baffles 16 adjacent the side walls of the vessel and a circulation in a vertical plane radially outward toward the side walls of the vessel and back toward the center both on the upper and lower sides of the impeller.

Fig. 2, which is a developed view of the outside of the vessel, shows the circulation around the side walls of the vessel as viewed from the outside. The liquid with a dispersed solids and gases moves outward toward the side walls of the vessel and flows around until striking the vertical baffles 16. Upon striking the baffles, the liquid divides at about the median plane of the impeller and flows upward along the baffle as indicated by arrows 17 and downward along the baffle as indicated by arrows 18.

The circulation in a vertical plane is shown in Fig. 3 where the arrows 19 indicate the circulation of liquid out from the upper side of the hub 6 toward the side of the vessel up toward the liquid level 5 and back toward the impeller and the arrows 20 indicate the circulation outward from the lower side of the hub 6 down toward the bottom of the vessel and up toward the center of the impeller. There are, of course, no sharply defined flow paths as indicated by the arrows 17–20. These arrows merely indicate the general visual observation of the flow. The flow in the direction of arrows 18 and 20 tends to pick up solids from the bottom of the vessel and to keep the solids dispersed in the liquid.

The liquid forced by the impeller blades 8 radially outward above and below the space between the upper side of the hub 6 and the disc 10 produces a suction in that space which draws gas outward through the openings 13 and intimately disperses the gas in the outflowing liquid. This causes a continuous recycling of the gas from the inlet openings 15 well above the liquid level in the vessel down through the bore 14 of the hollow shaft and out through the outlet openings 13. The space between the disc 10 and the hub 6 is essentially free of liquid when the impeller is rotating. From one aspect the disc and hub are upper and lower walls defining a passageway through which gas flows outward from the openings 13. The disc and hub are axially spaced at the outer periphery of the disc so that the outermost part of the passageway is annular and is presented directly to the liquid. The gas dispersing occurs in the vicinity of the outer periphery of the disc 10. The turbulence produced within the vessel is not a complete measure of the efficiency of the dispersion of the gas into the liquid. When the disc 10 is of slightly smaller diameter than the hub 6, as illustrated, the impeller will produce a great deal of fluid turbulence. As a diameter of the disc 10 is increased until it more nearly equals the diameter of the hub 6, the turbulence produced within the vessel will decrease but the efficiency of dispersion of gas into the outflowing liquid will remain essentially unchanged.

From one aspect the portion of the impeller between the upper side of the hub 6 and the disc 10 serves both for liquid circulation and for the dispersion of solids and gas into the circulating liquid. The portion of the impeller below the hub 6 serves more like the conventional impeller. The baffles or vanes 16 prevent vortex formation. In the absence of a vortex, the interfacial area between the gas and liquid is greater than when a vortex is present.

In reactions between gases and liquids or liquids containing solids, the autoclave shown increases the reaction rate over other autoclaves having rotary stirrers by a factor of 3 to 4 times. This increase results from the intimate dispersion of the gas in the reacting liquid and

What is claimed as new is:

1. In a closed or high pressure autoclave for reactions between gases and liquids, a closed vessel holding liquid reactants in its lower part, a tube having its upper end in the vessel above the liquid level and having its lower end submerged, a gas inlet to the interior of the tube above the liquid level for conducting gas to the interior of the tube, a gas outlet opening in the tube submerged below the liquid level for conducting gas out from the interior of the tube, a submerged disc above the gas outlet opening, a disc-like impeller hub spaced below the disc and defining therewith a passageway essentially free of liquid and leading radially outward from the gas outlet opening, the disc and hub being axially spaced apart at the outer periphery of the disc whereby the outermost part of the passageway between the hub and disc is annular and is presented directly to the liquid, means for rotating the hub, blades fixed to the hub for forcing liquid out from above and below the liquid free passageway between the hub and disc and inducing a flow of gas out through the outlet opening, said blades having outer ends projecting radially outside both the hub and disc and having inner ends extending axially between the hub and disc and projecting radially within both the hub and disc and into the liquid free passageway between the hub and disc, and baffle means outside the blades for blocking the flow of liquid circumferentially around the vessel.

2. In a closed or high pressure autoclave for reactions between gases and liquids, a closed vessel holding liquid reactants in its lower part, a tube having its upper end in the vessel above the liquid level and having its lower end submerged, a gas inlet to the interior of the tube above the liquid level for conducting gas to the interior of the tube, a gas outlet opening submerged below the liquid level for conducting gas out from the interior of the tube, submerged upper and lower walls respectively above and below the gas outlet opening defining an essentially liquid free passageway surrounding the gas outlet opening and leading radially outward from the gas outlet opening to the surrounding liquid, said walls blocking the flow of liquid into said passageway from above and below said passageway, said walls being axially spaced apart at their outer periphery whereby the outermost part of the passageway between the walls is annular and is presented directly to the liquid, and an impleler having blades with outer ends projecting radially outside both walls and the outermost part of said passageway for blocking the flow of liquid radially into said passageway and for forcing liquid radially outward from above and below the outermost part of said passageway and inducing a flow of gas through the gas outlet opening and said blades having inner ends extending axially between said walls and projecting radially within both of said walls and into said liquid free passageway.

3. In a closed or high pressure autoclave for reactions between gases and liquids, a closed vessel holding liquid reactants in its lower part, an upright rotary hollow drive shaft having its upper part in the vessel above the liquid level and having its lower part submerged, a gas inlet opening through the side of the shaft above the liquid level for conducting gas to the interior of the shaft, a gas outlet opening through the side of the shaft submerged below the liquid level for conducting gas out from the interior of the shaft, a disc-like hub fixed to the shaft below the outlet opening, a submerged disc above the gas outlet opening and spaced from the hub and defining with the hub a passageway essentially free of liquid, the hub having a diameter at least as great as the disc and the disc and hub being axially spaced at the outer periphery of the disc whereby the outermost part of the passageway between the hube and disc is annular and is presented directly to the liquid, blades fixed to the hub for forcing liquid outward from above and below the liquid free space between the disc and the hub and inducing a flow of gas through the outlet opening, said blades having outer ends projecting radially outside both the hub and disc and having inner ends extending axially between the hub and disc and projecting radially within both the hub and disc and into the liquid free passageway between the hub and disc.

References Cited in the file of this patent

UNITED STATES PATENTS

| | | |
|---|---|---|
| 1,990,602 | Guernsey et al. | Feb. 12, 1935 |
| 2,347,195 | Huff | Apr. 25, 1944 |
| 2,641,455 | Poirot | June 9, 1953 |
| 2,677,000 | Russum | Apr. 27, 1954 |
| 2,743,914 | Epprecht | May 1, 1956 |